(12) United States Patent
Nguyen et al.

(10) Patent No.: US 7,587,043 B2
(45) Date of Patent: Sep. 8, 2009

(54) SEALS FOR COMMUNICATION DEVICES AND METHOD FOR ASSEMBLING COMMUNICATION DEVICE

(75) Inventors: Bach L. Nguyen, Lauderhill, FL (US); Eric S. Penrod, Sunrise, FL (US); Francis M. Staszesky, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 577 days.

(21) Appl. No.: 11/286,991

(22) Filed: Nov. 23, 2005

(65) Prior Publication Data

US 2007/0123317 A1 May 31, 2007

(51) Int. Cl.
*H04M 1/00* (2006.01)
*H04M 9/00* (2006.01)

(52) U.S. Cl. .................. 379/433.02; 455/575.1

(58) Field of Classification Search .......... 379/433.01, 379/433.02; 381/87, 386, 392, 395; 455/575.1, 455/569.1
See application file for complete search history.

(56) References Cited

U.S. PATENT DOCUMENTS

2005/0014537 A1 * 1/2005 Gammon et al. ......... 455/575.1

* cited by examiner

*Primary Examiner*—Tuan D Nguyen

(57) ABSTRACT

A seal (200) in a communication device (100) and a method (600) for assembling the communication device are disclosed. A transducer (402) is positioned on a transducer portion (202) of the seal. The seal comprises an audio port (208) and an audio tunnel (206). A display (106) is positioned on a display portion (204) of the seal. The transducer, the display and the seal are positioned inside the communication device to enable the audio port and the audio tunnel to route audio signals out of the communication device.

16 Claims, 5 Drawing Sheets

SEALS FOR COMMUNICATION DEVICES AND METHOD FOR ASSEMBLING COMMUNICATION DEVICE

BACKGROUND OF THE INVENTION

1. Field of the Invention

This invention relates in general to communication devices and more particularly, to seals in communication devices.

2. Description of the Related Art

With the advancement of technology, there are phenomenal changes in the design and usage of communication devices. In the past, communication devices were used for limited purposes. Nowadays, the communication devices can perform a wide variety of tasks and can assist users in daily activities. The communication devices boast of various cutting edge technologies such as personal-computer-like user interfaces with enhanced displays, cameras, video players, MP3 functionalities, etc. Space constraints have to be kept in mind to incorporate all these features in the communication device. The communication devices these days comprise components that not only utilize extra space, but also increase effective costs of an instrument with increased piece counts.

The size of displays in communication devices has also grown with the incorporation of more features. With enhanced screens, a user can enjoy animated MMS (Multi Media Messaging) facilities for sending and receiving picture messages, and the user can also browse e-mail with ease. Increased display sizes often lead to the desire to shift audio ports, which are responsible for the dispersion of audio signals from transducers in communication devices, further towards the tips of such devices. Positioning the audio port too close to the top of the device, however, can result in poor audio quality to users of the communication devices, as the users have to adjust the positioning of the communication devices with respect to their ears.

SUMMARY OF THE INVENTION

Various embodiments of the present invention relate to a seal for a communication device and a method for assembling the communication device. In accordance with an embodiment of the present invention, a seal for a communication device is disclosed. The seal can comprise a transducer portion, a display portion and an audio tunnel. The transducer portion can insulate a transducer. Further, the transducer portion can comprise an audio port. The display portion can be coupled with the transducer portion and can protect a display. The audio tunnel can be coupled to the audio port of the transducer portion, and at least a portion of the audio tunnel can be positioned in front of the display. The audio port and the audio tunnel can route audio signals from the transducer.

In one arrangement, the display can have an active part and a non-active part, and the audio tunnel can be positioned in front of the non-active part of the display. In another arrangement, the seal can be positioned within a communication device such that the audio port and the audio tunnel route the audio signals from the transducer to disperse out the portable communication device. As an example, the seal can be made of a compliant material, such as silicon rubber. As another example, the seal can be an integrated structure such that the transducer portion and the display portion are a single unit.

In accordance with another embodiment of the present invention, a communication device is disclosed. The communication device can comprise a transducer, a display, a seal and a housing portion. The transducer can generate audio signals. A transducer portion of the seal can insulate the transducer. Further, a display portion of the seal can protect the display. The seal also can comprise an audio port and an audio tunnel. The housing portion may house the seal, the transducer and the display. At least a portion of the audio tunnel may be positioned in front of the display. The audio port and the audio tunnel can route the audio signals from the transducer such that the audio signals disperse from the housing portion.

In one arrangement, the housing portion can include an earpiece port. The audio port and the audio tunnel can route the audio signals through the earpiece port such that at least a portion of the earpiece port can be positioned in front of the display. As an example, a distance from a top of the housing portion to a bottom of the earpiece port can be at least approximately 13 mm. Also, an end of the audio tunnel can extend to the bottom of the earpiece port.

In another arrangement, the display can have an active part and a non-active part, and the audio tunnel can be positioned in front of the non-active part of the display. The communication device may be a clam-shell wireless device, and the housing portion can be a flip portion of the clam-shell wireless device. Additionally, the seal can be an integrated structure such that the transducer portion and the display portion are a single unit.

In accordance with yet another embodiment of the present invention, a method for assembling a communication device is disclosed. The method can comprise positioning a transducer on a transducer portion of a seal. The seal can comprise an audio port and an audio tunnel. The method can further comprise positioning a display on a display portion of the seal such that the display can be positioned behind at least a portion of the audio tunnel. The method can also include positioning the transducer, the display and the seal inside the communication device to enable the audio port and the audio tunnel to route audio signals out of a housing portion of the communication device.

The display can have an active part and a non-active part and positioning the display can further include positioning the non-active part of the display behind the audio tunnel. The communication device can also include a housing portion that can have an earpiece port, and the method can further include positioning a bottom of the earpiece port at least, for example, approximately 13 mm away from a top of the housing portion. The method can also include positioning an end of the audio tunnel such that the audio tunnel extends to the bottom of the earpiece port.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
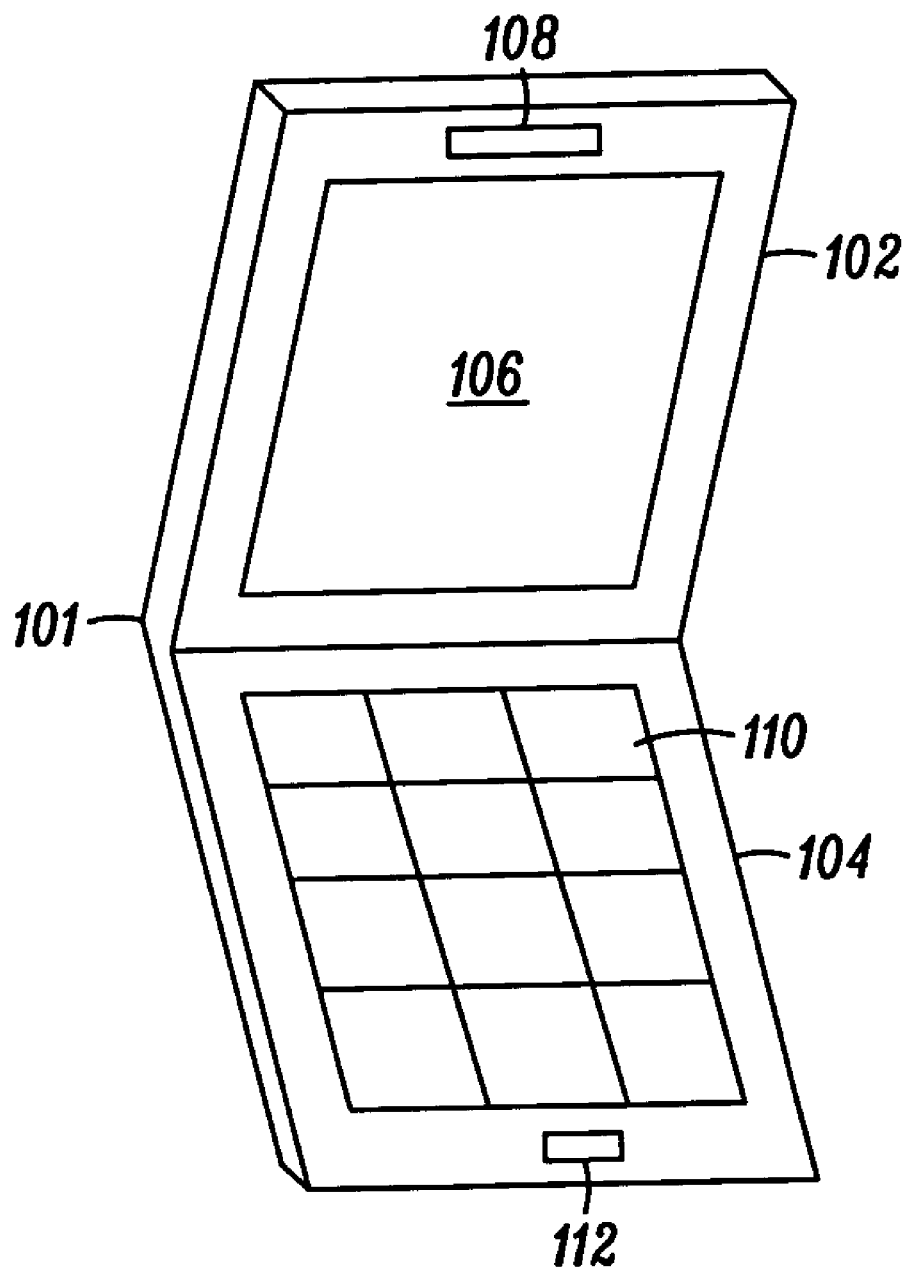
FIG. 1 illustrates an example of a communication device, in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one as or more than one. The term "plurality" as used herein, is defined as two as or more than two. The term "another" as used herein, is defined as at least a second or more. The terms "including" and/or "having" as used herein, are defined as comprising (i.e. open language). The term "coupled" as used herein, is defined as connected, although not necessarily directly, and not necessarily mechanically.

Referring to FIG. 1, an exemplary communication device 100 is shown, in accordance with an embodiment of the present invention. The communication device 100 can be, for example, a wireless clam-shell telephone. In FIG. 1, a housing 101 of the communication device 100 can include two portions—a flip portion 102 and a base portion 104. It should be appreciated that various embodiments of the present invention can also be practiced in a communication device that comprises only one housing portion. The flip portion 102 can house a display 106, an earpiece port 108, a transducer, and a seal (not shown in FIG. 1). The base portion 104 can include a keypad 110 for entering numbers and text, etc., and an audio receiver 112 for receiving input audio signals from users.

Figure 2:
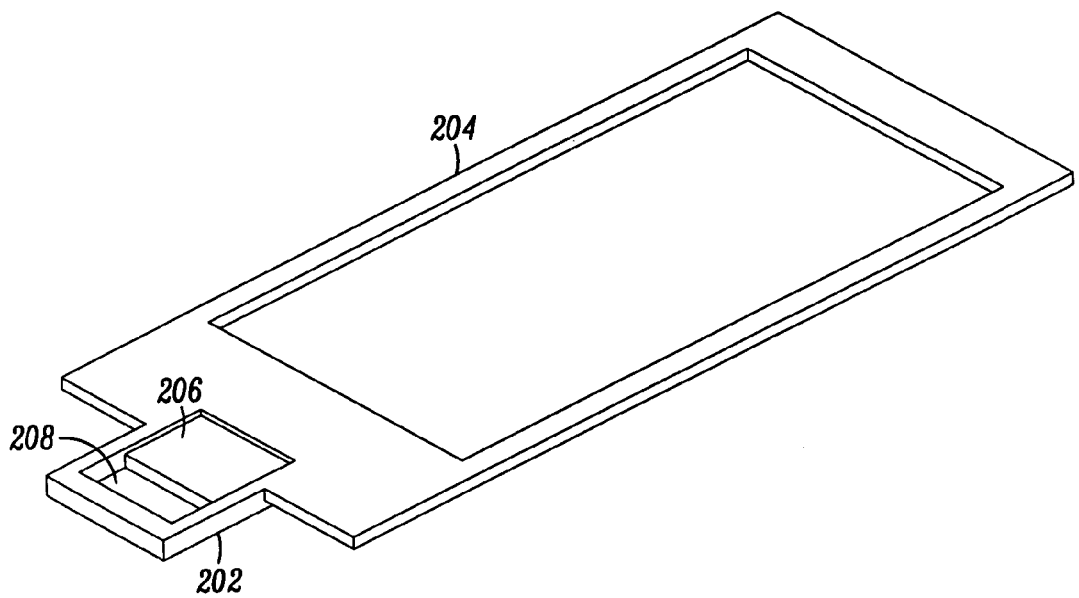
FIG. 2 illustrates an image of an underneath side of a seal, in accordance with a first embodiment of the inventive arrangements.

Referring to FIG. 2, an image of an underneath side of a seal 200 is shown, in accordance with a first embodiment of the inventive arrangements. The seal 200 may be an integrated structure that protects and insulates the components of the communication device 100 while providing extra space inside the flip portion 102. It is understood, however, that the seal 200 can be constructed of two or more pieces that are joined together through any suitable means. The extra space can be used, for example, to increase the display size while providing a good audio quality to a user of the communication device 100.

The seal 200 can be made of any suitable material that provides the required insulation and support and allows audio signals to be routed without undue attenuation. As an example, the seal 200 can be constructed of a compliant material, such as silicon rubber, although other suitable substances can be used, even rigid materials. The term compliant material can mean any material that can be molded or formed into a three-dimensional shape. The seal 200 can include a transducer portion 202, a display portion 204, and an audio tunnel 206. The transducer portion 202 can insulate a transducer (not shown here) in the communication device 100. The shape of the transducer portion 202 can be circular, rectangular or any other shape that complements the shape of the transducer. The transducer portion 202 can include an audio port 208 that can help direct audio signals to the outside of the communication device 100, including those signals that enter the audio tunnel 206.

The display portion 204 can protect the display 106 in the communication device 100. An exemplary display for communication devices is a liquid crystal display (LCD). The shape of the display portion 204 may complement the shape of the display 106 and can protect the display 106 from dust, liquids, and other such contaminants or from the shock produced when the device 100 is accidentally dropped or bumped. As will be described below, the audio tunnel 206 can provide a passage for audio signals to propagate underneath parts of the display 106 and to disperse out of the communication device 100.

Figure 3:
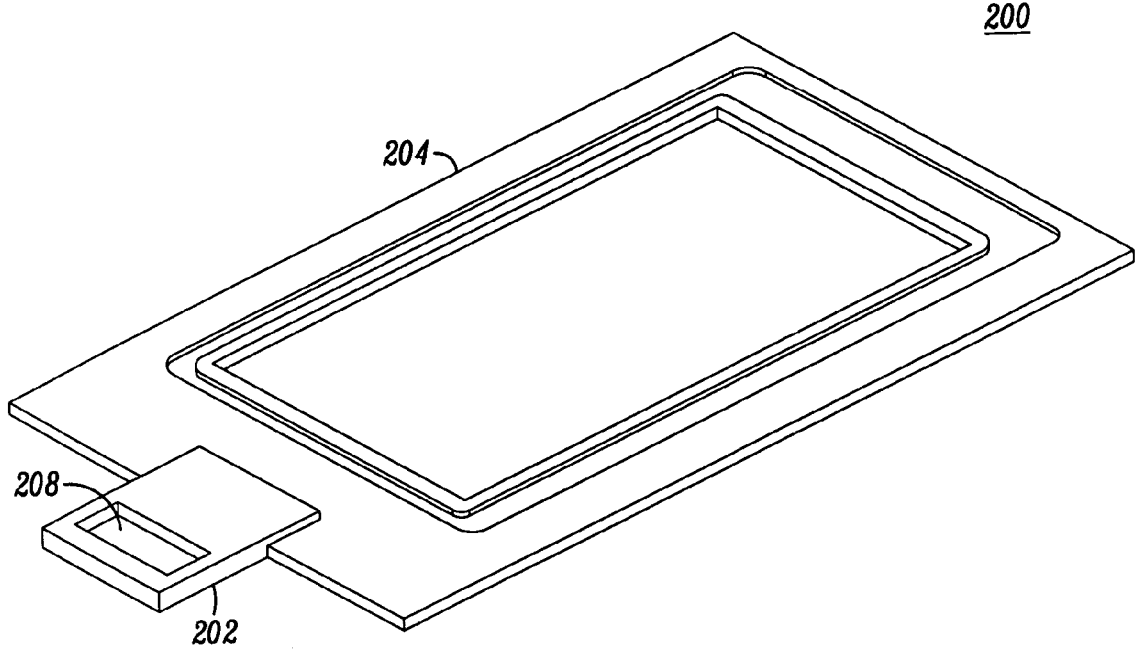
FIG. 3 illustrates an image of a top side of a seal, in accordance with the first embodiment of the inventive arrangements.

Referring to FIG. 3, an image of a top side of the seal 200 is shown, in accordance with the first embodiment of the inventive arrangements. The transducer portion 202, the display portion 204, and the audio port 208 are shown in FIG. 3. As will be shown later, it is on the top side of the seal 200 where a transducer and the display 106 can be positioned.

Figure 4:
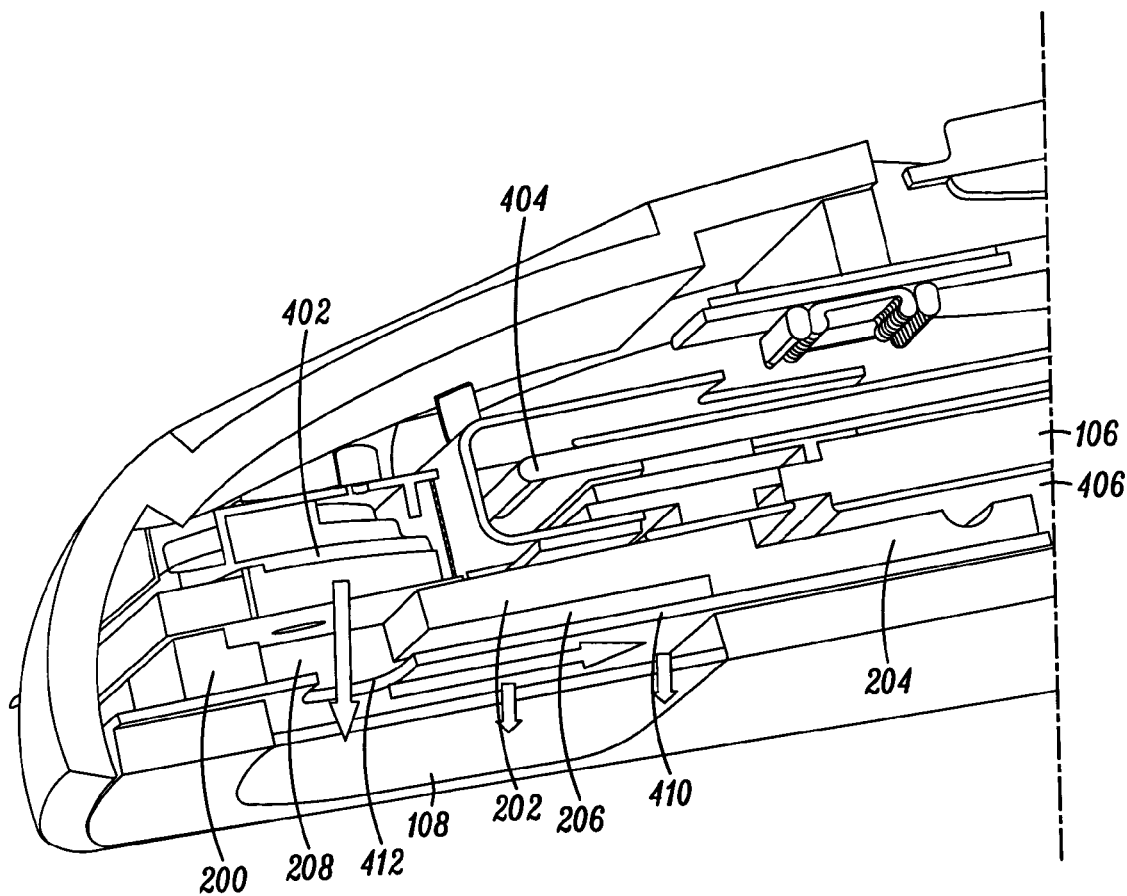
FIG. 4 illustrates a cross-sectional image of a flip portion of a communication device, in accordance with an embodiment of the inventive arrangements.

Referring to FIG. 4, a cross-sectional image of the flip portion 102 of the communication device 100 is shown, in accordance with an embodiment of the present invention. The flip portion 102 can include the seal 200, the display 106, the earpiece port 108 and a transducer 402. The audio signals generated by the transducer 402 can be dispersed out through the earpiece port 108. As explained earlier, the seal 200 can include the transducer portion 202, the display portion 204, and the audio tunnel 206. The transducer portion 202 of the seal 200 can include the audio port 208, which can be communicatively coupled with the audio tunnel 202 to provide a passage for the audio signal to disperse out the communication device 100 through the earpiece port 108. A potential path taken by the audio signals generated by the transducer 402 is represented by several arrows.

In one embodiment, the flip portion 102 may include an audio seal 410, which can include an aperture 412. This audio seal 410 is an optional feature, although the aperture 412 can help direct sound from the transducer to the earpiece port 108. In another embodiment, the earpiece port 108 can include a grill (not shown) or a mesh (not shown) to help prevent dirt or other contaminants from entering the flip portion 102 through the earpiece port 108.

In accordance with an embodiment of the invention, the audio tunnel 206 can be positioned beneath the display 106. In particular, the audio tunnel 206 can be positioned beneath a non-active part 404 of the display 106. A non-active part of the display can be defined as a part of the display 106 that does not display actual images. As can be seen, the transducer portion 202 can protect the non-active part 404 of the display 106. The display 106 can also include an active part 406, which can be defined as that part of a display that actually displays images. In one arrangement, the display portion 204 of the seal 200 can protect at least a portion of the active part 406 of the display 106.

In view of the audio tunnel 206, the earpiece port 108 can be positioned farther away from the top of the flip portion 102. This configuration, however, does not require the display 106 to be moved farther away from the top of the flip portion 102, as a portion of the display 106 can be positioned over the audio tunnel 206. In addition, prior art systems include displays in which the non-active portion of the display is positioned at the end of the display that is opposite that of the top of the flip portion. In contrast, because the non-active part 404 of the display 106 is positioned near the top of the flip portion 102, the inventive system can allow for more room at the opposite end of the display 106.

Figure 5:
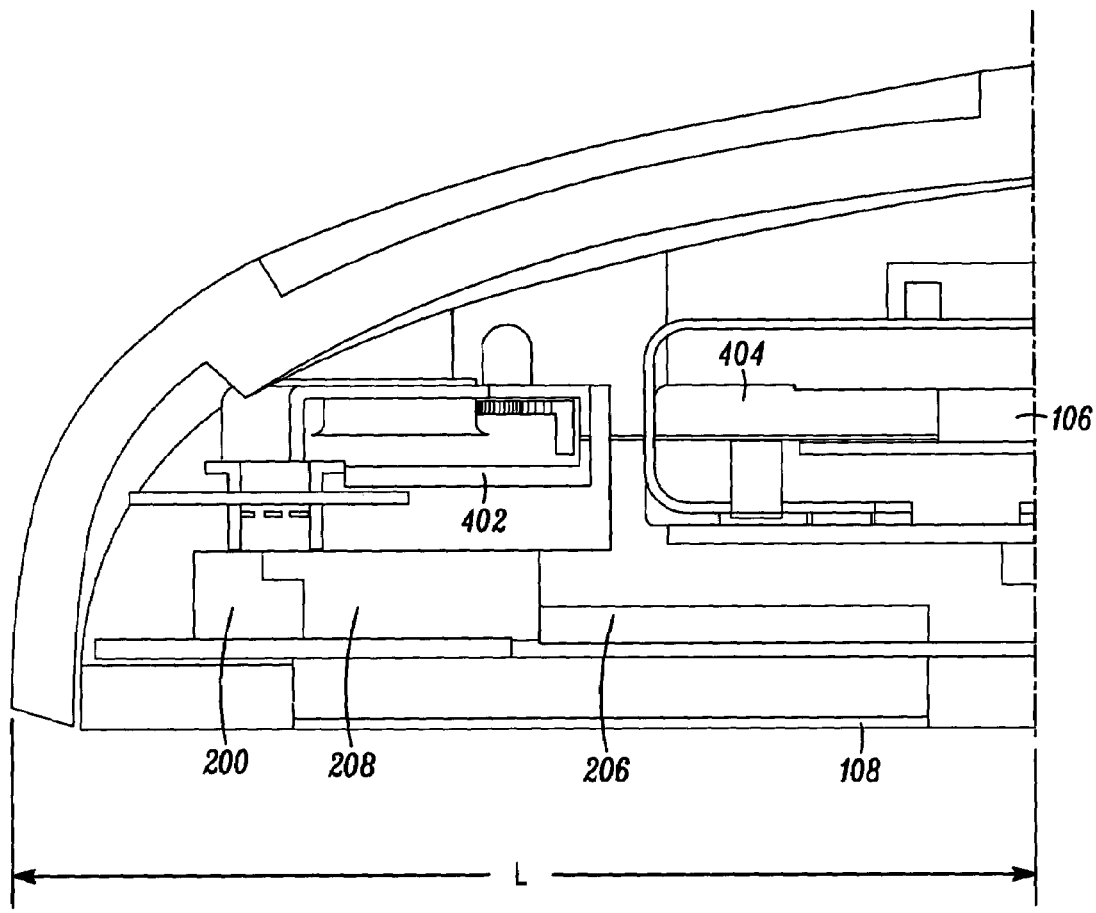
FIG. 5 illustrates another cross-sectional image of a flip portion of a communication device, in accordance with another embodiment of the inventive arrangements.

Referring to FIG. 5, another cross-sectional diagram of the flip portion 102 of the communication device 100 is shown, in accordance with another embodiment of the present invention. The seal 200 is positioned inside the flip portion 102. The audio port 208 and the audio tunnel 206 can route audio signals from the transducer 402 to disperse out of the communication device 100. The audio tunnel 206 can route the audio signals underneath the non-active part 404 of the display 106. The audio signals may be dispersed out from the communication device 100 through the earpiece port 108.

In accordance with an embodiment of the present invention, the distance, 'l', from the tip of the flip portion 102 to the bottom of the earpiece port 108, can be varied depending on the overall design of the flip portion 102. Accordingly, in one arrangement, the length of the audio tunnel 206 can be kept such that audio signals can propagate underneath the display 106. For example, the distance from the tip of the flip portion 102 to the bottom of the earpiece port 108 can be kept as 0.013 meters (13 millimeters). This position of the earpiece port 108 has been experimentally determined to provide best audio quality to the users. It is understood, however, that the distance from the top of the flip portion 102 to the bottom of the earpiece port 102 can be any other suitable distance.

Figure 6:
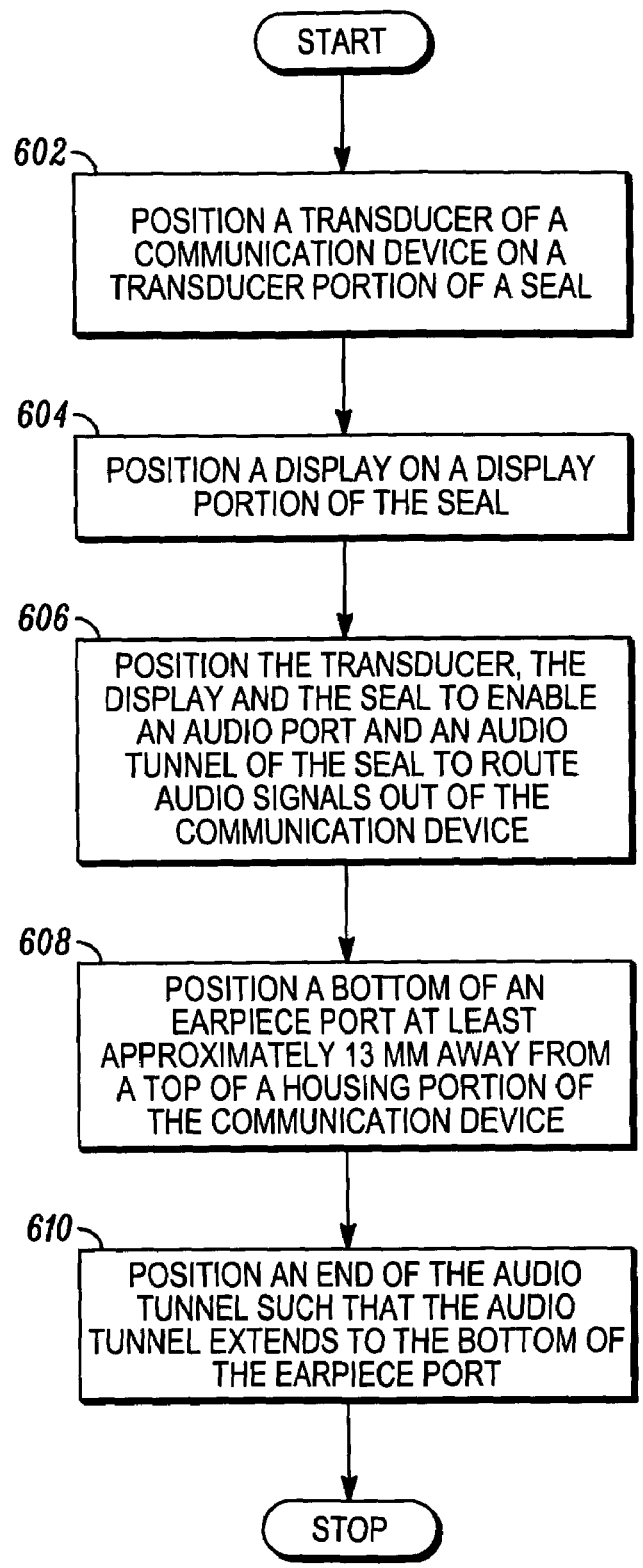
FIG. 6 illustrates a flowchart of a method for assembling a communication device, in accordance with an embodiment of the inventive arrangements.

Referring to FIG. 6, a flowchart for a method for assembling a communication device is shown, in accordance with an embodiment of the present invention. In accordance with an embodiment of the present invention, the communication device can be a wireless clam-shell device. The communication device can include a housing portion, which can have a seal, a display, a transducer and an earpiece port. At step 602, the transducer can be positioned on a transducer portion of the seal. The seal can further include an audio port and an audio tunnel.

At step 604, the display can be placed on a display portion of the seal such that the display portion, for example, can be placed behind the audio tunnel. The display can have an active part and a non-active part. In accordance with an embodiment of the present invention, the non-active part of the display can be positioned behind the audio tunnel. At step 606, the transducer, the display, and the seal can be positioned inside a flip portion of the communication device such that the seal can form the audio tunnel, which, coupled with the audio port, can provide an underneath passage for audio signals to disperse out of the communication device through the earpiece port.

At step 608, the earpiece port can be positioned such that the bottom of the earpiece port lies at a distance of, for example, approximately 13 mm from the tip of the flip portion of the communication device. At step 610, the audio tunnel can be positioned such that an end of the audio tunnel can be extended to a bottom of the earpiece port. It must be noted that the method is not limited to the order of the steps listed here, and the method may include a greater or fewer number of the steps presented here.

Various embodiments of the present invention provide a seal in a communication device. The seal can protect and insulate a display and a transducer in the communication device. The seal can make provisions for extra space inside the communication device. The extra space can be utilized for some other purposes, such as providing a bigger display, while ensuring a good audio quality to users of the communication device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A seal for a communication device, comprising: a seal having a transducer portion that insulates a transducer, wherein the transducer portion includes an audio port; a display portion coupled to the transducer portion, wherein the display portion protects a display; and an audio tunnel coupled to the audio port, wherein at least a portion of the audio tunnel is positioned in front of the display and wherein the audio port and the audio tunnel route audio signals from the transducer.

2. The seal of claim 1, wherein the display has an active part and a non-active part and the audio tunnel is positioned in front of the non-active part of the display.

3. The seal of claim 1, wherein the seal is positioned within a communication device such that the audio port and the audio tunnel route the audio signals from the transducer to disperse out the communication device.

4. The seal of claim 1, wherein the seal is made of a compliant material.

5. The seal of claim 1, wherein the seal is an integrated structure such that the transducer portion and the display portion are a single unit.

6. A communication device, comprising:
a transducer that generates audio signals;
a display;
a seal having a transducer portion that insulates the transducer, a display portion that protects the display, an audio port and an audio tunnel; and
a housing portion, wherein the transducer, the display and the seal are all housed within the housing portion, wherein at least a portion of the audio tunnel is positioned in front of the display and wherein the audio port and the audio tunnel route audio signals from the transducer to disperse out of the housing portion.

7. The communication device of claim 6, wherein the housing portion includes an earpiece port, wherein the audio port and the audio tunnel route the audio signals through the earpiece port such that at least a portion of the earpiece port is positioned in front of the display.

8. The communication device of claim 7, wherein a distance from a top of the housing portion to a bottom of the earpiece port is at least approximately 13 mm.

9. The communication device of claim 8, wherein an end of the audio tunnel extends to the bottom of the earpiece port.

10. The communication device of claim 6, wherein the display has an active part and a non-active part and the audio tunnel is positioned in front of the non-active part of the display.

11. The communication device of claim 6, wherein the communication device is a clam-shell wireless device and the housing portion is a flip portion of the clam-shell wireless device.

12. The communication device of claim 6, wherein the seal is an integrated structure such that the transducer portion and the display portion are a single unit.

13. A method for assembling a communication device, comprising:

positioning a transducer on a transducer portion of a seal, wherein the seal includes an audio port and an audio tunnel;

positioning a display on a display portion of the seal such that the display is positioned behind at least a portion of the audio tunnel; and positioning the transducer, the display and the seal in the communication device to enable the audio port and the audio tunnel to route audio signals out of the communication device.

14. The method of claim 13, wherein the display has an active part and a non-active part and positioning the display further comprises positioning the non-active part of the display behind the audio tunnel.

15. The method of claim 13, wherein the communication device includes a housing portion that has an earpiece port and the method further comprises positioning a bottom of the earpiece port at least approximately 13 mm away from a top of the housing portion.

16. The method of claim 15, further comprising positioning an end of the audio tunnel such that the audio tunnel extends to the bottom of the earpiece port.

* * * * *